United States Patent [19]
Dolikian

[11] 4,288,831
[45] Sep. 8, 1981

[54] SHUTDOWN CIRCUIT FOR A SWITCHING POWER SUPPLY

[75] Inventor: Arman V. Dolikian, Palatine, Ill.

[73] Assignee: Motorola, Inc., Schaumburg, Ill.

[21] Appl. No.: 102,683

[22] Filed: Dec. 12, 1979

Related U.S. Application Data

[63] Continuation of Ser. No. 881,309, Feb. 27, 1978, abandoned.

[51] Int. Cl.³ .............................................. H02H 7/12
[52] U.S. Cl. ........................................ 361/92; 361/86; 363/26; 363/50; 323/247; 323/282; 307/234
[58] Field of Search ..................... 361/86, 92, 88, 89, 361/18, 100; 363/26, 50–57; 323/225 C, 22 T, 34, 17–19, 38; 328/112, 133, 134; 307/234, 232, 233 R; 364/600

[56] References Cited

U.S. PATENT DOCUMENTS

| | | | |
|---|---|---|---|
| 3,701,937 | 10/1972 | Combs | 363/50 X |
| 3,879,647 | 4/1975 | Hamilton et al. | 363/50 X |
| 3,896,341 | 7/1975 | Kodama | 307/234 X |
| 3,906,258 | 9/1975 | Moe | 307/234 X |
| 3,927,352 | 12/1975 | Schatz | 361/86 |
| 3,940,663 | 2/1976 | Meier et al. | 361/92 X |
| 3,969,635 | 7/1976 | Wilke | 361/92 X |
| 3,980,960 | 9/1976 | Hutchinson | 307/234 X |
| 4,031,463 | 6/1977 | Norberg | 361/86 X |
| 4,071,900 | 1/1978 | Jensen | 307/234 X |

Primary Examiner—Patrick R. Salce
Attorney, Agent, or Firm—James A. Scheer; James W. Gillman

[57] ABSTRACT

A switching mode power supply provides a D.C. output voltage having a value related to the duty cycle of the supply's controlled oscillator produced signal. The inventive shutdown circuit inhibits operation of the supply if the duty cycle increases to a value indicative of failure of the supply to produce a minimum desired output voltage. Operation of the supply is inhibited for a predetermined shutdown interval following which a restart cycle deactivates the shutdown circuit for a period to allow the supply to attempt to establish its desired output.

3 Claims, 3 Drawing Figures

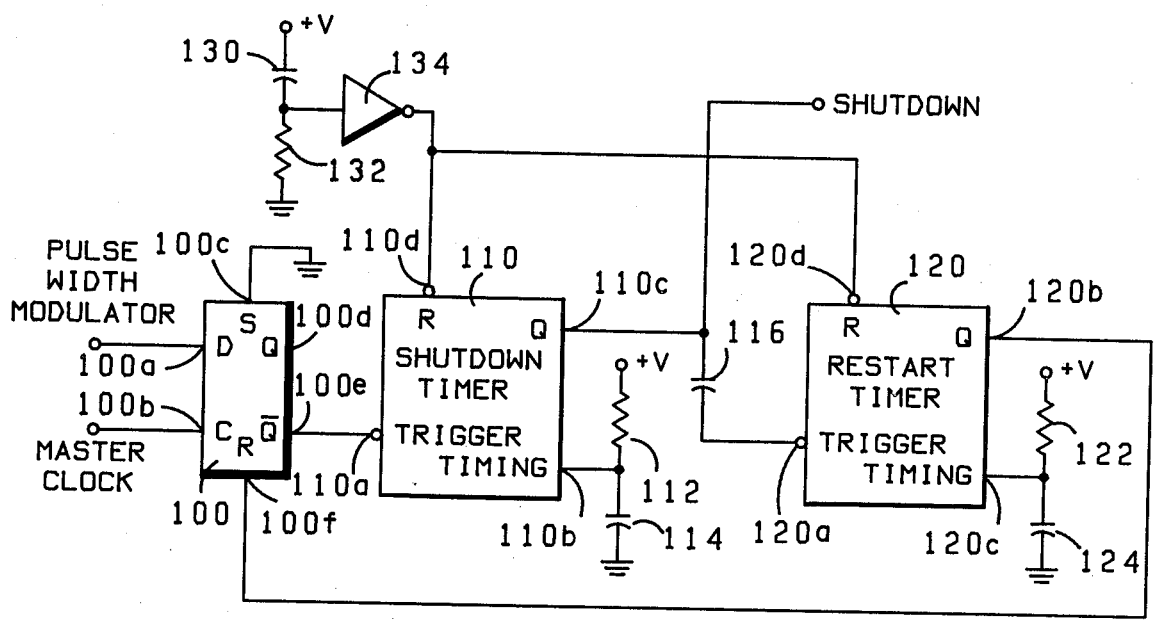
$\overline{\pm\pm\equiv}.2$
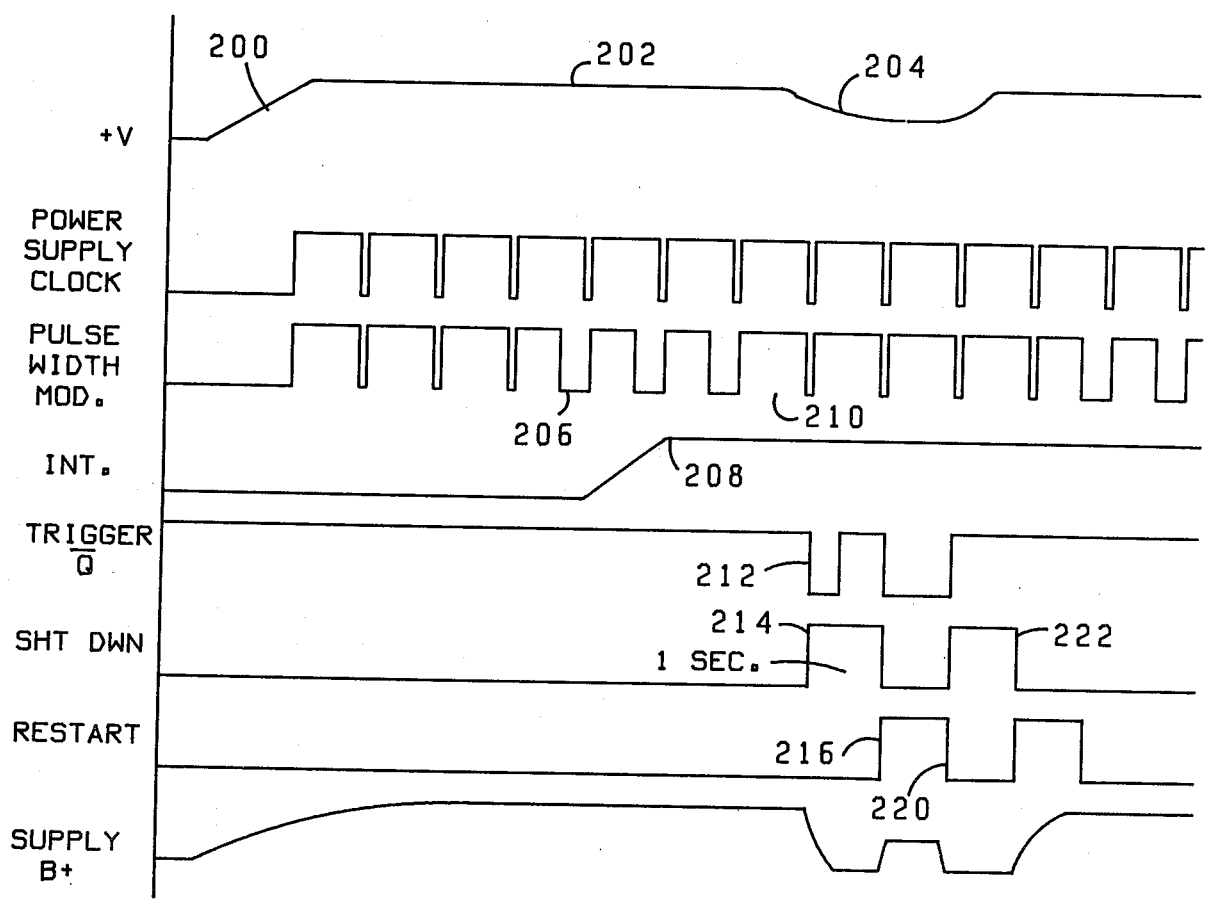
$\overline{\pm\pm\equiv}.3$

1

SHUTDOWN CIRCUIT FOR A SWITCHING POWER SUPPLY

This is a continuation of application Ser. No. 881,309, filed 2/27/78, now abandoned.

BACKGROUND OF THE INVENTION

The present invention pertains to the electrical power supply art and, more particularly, to improved power supply shutdown apparatus.

Power supply shutdown circuits are well known, particularly in the electronics art. Such shutdown circuits sense for the condition of any defined fault, such as overcurrent, overvoltage, undervoltage, extreme operation temperature and so on and inhibit operation of the supply in response to the fault occurring.

In a particular application, a power shutdown supply which responds to a low voltage condition is required for use in a mobile data terminal. There, proper functioning of the terminal requires that a specified voltage be applied to a central microprocessor. Should the power supply voltage fall below a given value, the microprocessor is likely to generate numerous errors.

For the above mentioned mobile data terminal application, a switching mode type power supply is used. In such supplies, a controlled oscillator drives the primary of a transformer. Power supply voltage is taken from the transformer's secondary, after suitable rectification and filtering. A feedback signal from the supply's output is compared with a stable DC reference to generate an error signal which is coupled to the controllable oscillator. The error signal causes either the frequency or duty cycle, depending upon the oscillator's design, to vary in such a manner that the output voltage is maintained at a desired level.

In power supply low voltage shutdown circuits according to the prior art, the output voltage from the supply is compared to a fixed stable reference and the supply inhibited if the output voltage has a predetermined relationship to the reference. The problem with such prior art shutdown systems is not only do they require a temperature and time stable voltage reference, but also they require temperature and time stable associated components. This results in a shutdown circuit of considerable cost. Thus, the prior art has felt a need for a precise yet inexpensive low voltage shutdown circuit, particularly suited for switching mode type power supplies.

SUMMARY OF THE INVENTION

It is an object of this invention, therefore, to provide improved voltage shutdown apparatus which does not require a stable voltage reference.

It is a further object of this invention to provide the above described voltage shut down apparatus which is particularly adapted for inhibiting operation of a switching type supply.

Briefly, according to the invention, an improved shutdown means is provided for a switching type power supply, which supply produces an output voltage which is a function of the output from a controlled oscillator. The improvement comprises means which inhibits operation of the supply in response to a predetermined output from the controlled oscillator. As a feature of the invention, for applications wherein the controlled oscillator varies its duty cycle to maintain output voltage, the power supply is inhibited when the controlled oscillator produces a predetermined duty cycle output.

It is another feature of the invention that a shutdown timer may be provided which inhibits operation of the power supply for a predetermined interval in response to the occurrence of the aforementioned predetermined controlled oscillator output. Additionally, a restart timer may be provided which deactivates the inhibiting circuitry for a predetermined time interval following the shutdown timer predetermined interval thereby allowing the supply to reestablish its output voltage.

BRIEF DESCRIPTION OF THE DRAWINGS

FIG. 2 is a detailed schematic diagram of the preferred embodiment of the improved shutdown apparatus; and FIG. 3 is a series of waveforms illustrative of operation of the improved shutdown apparatus shown in FIGS. 1 and 2.

DETAILED DESCRIPTION OF THE PREFERRED EMBODIMENT OF THE INVENTION

Figure 1:
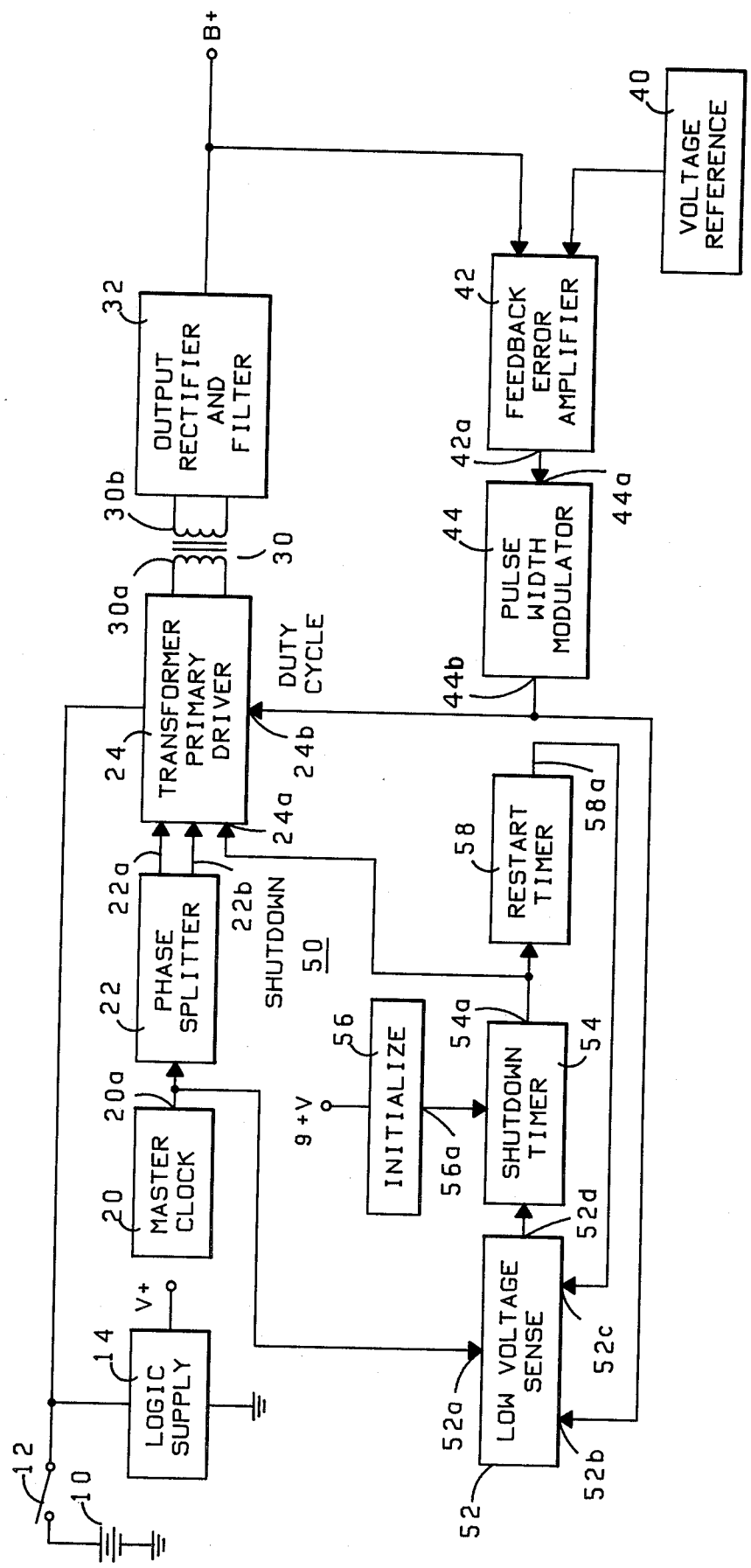
FIG. 1 is a block diagram illustrating the topology of a switcing power supply in combination with the improved shutdown apparatus.

FIG. 1 illustrates, in block diagram form, the inventive shutdown circuit in combination with a switching mode type power supply used in a mobile data terminal. The data terminal is located in an automotive vehicle, and, thus, electrical power is supplied through an automotive battery 10. The function of the power supply is to provide an output DC bias B+ suitable for powering a microprocessor (not shown) which controls operation of the data terminal. Due to the nature of computer equipment, any drop in applied DC bias voltage below a given operating tolerance may cause the digital memory components to lose their proper state and result in a subtle or catastrophic equipment failure. Thus, it is a function of the shutdown circuit to sense this condition and inhibit operation of the power supply as long as the condition exists.

Power from the battery 10 couples through a provided switch 12 to a logic supply voltage regulator 14. Logic supply voltage regulator 14 is of conventional design and produces an output DC bias V+ which is used to bias the power supply and shutdown circuitry.

The power supply is of the switching mode type and includes a master oscillator 20 which produces a fixed frequency AC signal at its output 20a. The clock frequency from master clock 20 is divided into equal amplitude but 180° out of phase signals in a conventional phase splitter 22. The out of phase signals appear at the phase splitter outputs 22a, b. The out of phase clock signals from phase splitter 22 couple to the transformer primary driver 24. Transformer driver 24 is of conventional design in such switching type supplies and includes processing circuitry to apply the phase signal splitters to output transistors which couple to the primary winding 30a of the switching mode transformer 30. Provided in transformer primary driver 24 is a shutdown input 24a which, upon receiving a suitable shutdown signal, inhibits operation of the power supply. Also provided is a duty cycle feedback input 24b which, as is more fully described hereinbelow, responds to an error signal input to vary the duty cycle of the phase split clock signal to predeterminedly control the current conduction time through the primary 30a of transformer 30.

The secondary 30b of transformer 30 couples to the input of an output recitifier and filter circuit 32. This circuit is of conventional design and rectifies the filters the DC signal appearing at the transformer secondary 30b, producing an output DC bias B+ used to power the aforementioned microprocessor and related logic circuitry.

Regulation of the instant supply is provided by sensing the output DC voltage B+ and comparing this voltage to the voltage from a stable voltage reference source 40 in a feedback error amplifier comparator 42. The signal appearing at the feedback error amplifier's output 42a is, thus, a function of the difference between the output produced DC voltage B+ and the stable voltage reference 40 produced DC voltage. The error voltage is coupled to the input 44a of a pulse width modulator 44. The output 44b of pulse width modulator 44 connects to the duty cycle input 24b of the transformer primary driver 24. Acting in the conventional manner, the pulse width modulator 44 responds to the magnitude of the error signal applied at its input 44a to produce an output signal of duty cycle ranging between predetermined limits, in the present application ranging between 20 to 90%. The duty cycle input at transformer primary driver input 24b is gated with the master clock phase split signal to thereby produce a fixed frequency, variable duty cycle signal which controls the conduction time of the drivers to the transformer primary 30a.

Thus, during turn on of the power supply, the output DC voltage B+ is less than the voltage reference 40 whereby the pulse width modulator maintains conduction of the transformer primary 30a at a 90% rate. Once the produced output DC voltage B+ reaches the reference voltage 40, the pulse width modulator reduces the conduction time of primary 30a to stabilize at the desired output voltage.

Thus, in summary, the instant power supply is seen to be of the switch mode type wherein a feedback loop varies the duty cycle of a controlled oscillator to control the output produced DC voltage.

As mentioned hereinabove, the instant shutdown circuitry, indicated generally at 50, shuts down or inhibits operation of the power supply in the event that the output produced DC voltage B+ falls below some preset limit. In the prior art, analog shutdown schemes were applied, which analog schemes required high stability components for precise operation. In a device according to the instant invention, a completely digital shutdown circuit is utilized, thus eliminating the need for stable components.

Referring again to FIG. 1, the power shutdown circuit 50 includes a low voltage sense circuit 52 to which is applied the master clock 20 signal at a first input signal 52a and the pulse width modulator 45 produced duty cycle signal at its second input 52b. In a manner described more fully with respect to FIGS. 2 and 3, the low voltage sense circuit 52 compares the master clock produced signal with the duty cycle signal and activates its output 52d if the duty cycle increases to its maximum allowed level, i.e. 90%. An activated output from voltage sense circuit 52 triggers a shutdown timer 54 which produces a predetermined duration time interval signal at its output 54a suitable for inhibiting operation of the power supply via the shutdown input 24a of the transformer primary driver 24. In this, the preferred embodiment of the invention, the interval of shutdown timer 54 is approximately one second. As mentioned hereinabove, during power turn-on the pulse width modulator operates the transformer primary driver 24 at the 90% duty cycle rate until the output DC voltage B+ reaches its desired value. To eliminate falsing of the shutdown circuit during the turn-on condition, an initialize circuit 56, which is powered by the logic supply produced voltage V+, produces a signal at its output 56a suitable for inhibiting operation of the shutdown timer 54 for a predetermined interval following turn-on.

In addition, at the conclusion of the predetermined inhibit interval, a restart timer 58 is activated. Restart timer 58 produces a output signal at its output 58a which is coupled back to an input 52c of the low voltage sense circuit 52. Upon receiving a restart timing signal at its input 52c, the low voltage sense circuit 52 is inhibited from triggering the shutdown timer 54. Thus, by use of the restart timer 58, the shutdown circuitry 50 is deactivated for a predetermined time period following power supply shutdown to allow the power supply produced DC output voltage B+ to rise to its desired level by operating at a 90% duty cycle. In this, the preferred embodiment of the invention, the restart timer 58 has a 100 millisecond restart interval.

FIG. 2 is a detailed schematic diagram of the shutdown circuit 50 illustrated in FIG. 1. Here, the low voltage sense circuit 52 is comprised of a D flip flop 100. Applied to the D input 100a is the output of the pulse width modulator 44 (FIG. 1). Applied to the clock input 100b of flip-flop 100 is the output from the master clock oscillator 20 (FIG. 1). The set input 100 c is connected to reference, or ground potential and the Q output 100d is left with no connection. The output from the D flip-flop is taken at the $\overline{Q}$ output 100e.

The output from the D flip-flop 100 is applied to the trigger input 110a of a timing circuit 110. In this, the preferred embodiment of the invention, the timing circuit is comprised of a standard 555 type timer integrated circuit, commercially available from Motorola, Inc. Timing circuit 110 is connected in the monostable mode such that the time duration of its output pulse is determined by the values of a timing resistor 112 and timing capacitor 114. Resistor 112 and capacitor 114 are series connected between the logic supply voltage +V and ground potential, with their common node applied to the timing input 110b of timing circuit 110. In response to receiving a negative transition pulse at its trigger input 110a, timing circuit 110 drives its Q output 110c high for the predetermined time interval. This level is then coupled to the shutdown input of the power supply, as is shown in FIG. 1.

Upon the conclusion of the shutdown timing signal, a trigger pulse is coupled through a coupling capacitor 116 to the toggle input 120a of the restart timing circuit 120. As with the shutdown timer 110, the restart timer 120 is, in this the preferred embodiment of the invention, comprised of a 555 timer integrated circuit. Upon receipt of a trigger input, the restart timer 120 drives its Q output 120b high for a predetermined time interval which is determined by the values of timing resistor 122 and timing capacitor 124. Resistor 122 and capacitor 124 connect between the logic supply DC bias +V and ground potential, and their common node connects to the timing input 120c of the restart timer 120. The Q output 120b of restart timer 120 is connected to the reset input 100f of D flip-flop 100. Thus, regardless of the state of the input signals applied at its D and C inputs 100a, b, respectively, the D flip-flop 100 is prevented from producing a trigger signal at its $\overline{Q}$ output 100e for the duration of the restart timer interval. This, in turn, prevents operation of the shutdown timing interval until the power supply has had a time to rise to its desired voltage.

To prevent activation of the shutdown timer 110 upon turn-on of the power supply, the initialize circuit of FIG. 1 is realized by a timing circuit comprised of a series capacitor 130 and resistor 132, connected between the logic supply DC voltage +V and ground potential, and whose common connection connects to the input of a standard inverter stage 134. Thus, as is determined by the value of capacitor 130 and resistor 132, at power turn-on the output from inverter 134 will be suitable for resetting the shutdown and restart timers 110, 120 for a predetermined interval until such time as the capacitor 130 is charged through resistor 132 to ground potential. Thus, the output from inverter 134 is coupled to the reset inputs 110d, 120d of the timers 110, 120, respectively.

Precise operation of the shutdown apparatus is more clearly understood with respect to the waveforms shown in FIG. 3. Here, the first line labeled +V illustrates the level of the logic supply voltage +V during turn-on at portion 200; during proper operation at portion 202; and during a voltage slump at portion 204.

Once the logic supply +V rises to a sufficient level the power supply clock begins producing its fixed frequency signal, as is shown in the second line of FIG. 3. For the first few cycles of power supply operation, the pulse width modulator 44 causes the transformer driver 24 to operate at its maximum, i.e. 90%, duty cycle to thereby rapidly increase the output voltage B+, as is shown in the last line of FIG. 3.

Once the produced output voltage B+ rises to its desired level, the feedback error amplifier activates the pulse width modulator, and thus the transformer primary driver, to a duty cycle of approximately 60% as is shown at portion 206 of the pulse width modulator waveform.

To prevent the shutdown circuit from inhibiting power supply operation during the initial turn-on period when a 90% duty cycle is required, the reset inputs 110d, 120d of timers 110, 120 are kept low by the initialize signal, here shown in the fourth line of FIG. 3, which deactivates the timers until the instant at portion 208.

As long as the battery 10 output voltage remains above a given level, the power supply will continue to produce a highly stabilized fixed output DC voltage B+ by suitably varying the duty cycle of the transformer primary driver 24. During normal operation, the D input 100a of flip-flop 100, containing the pulse width modulator output signal, is set by the master clock signal at the beginning of each clock cycle and is reset during a clock cycle. Thus, the Q output 100e of D flip-flop 100 assumes a constant high output level during normal operation of the power supply.

Upon occurrence of a fault condition, such as an instantaneous power drain on battery 10 (FIG. 1) causing it to significantly reduce its output DC voltage, the power supply may be unable to maintain its regulated output level B+. Such a fault is indicated by portion 204 of the +V waveform. During this period, the feedback error amplifier 42 activates the pulse width modulator 44 back to a 90% duty cycle, as is illustrated by portion 210 of the pulse width modulator waveform. Now, the D input 100a of flip-flop 100 is not reset prior to conclusion of a clock interval and the $\overline{Q}$ output 100e produces an output trigger pulse, as is illustrated at portion 212 of the fifth waveform of FIG. 3. Upon the occurrence of the trigger pulse 212, the shutdown timer 110 is activated whereby it produces a one second output pulse at its Q output 110c, as is shown at portion 214 of the sixth line in FIG. 3. This shuts down the power supply for the one second interval.

Upon the negative transition of the shutdown timer interval, the restart timer is triggered thereby producing the predetermined restart interval, illustrated as portion 216 of the seventh waveform of FIG. 3. The restart signal deactivates the shutdown circuit for the predetermined time period thereby allowing the pulse width modulator to drive the transformer primary driver 24 at the 90% duty cycle rate in an attempt to bring the output voltage B+ to its desired level. This is illustrated in the last line of FIG. 3. In the instant example, the fault condition 204 continues during the restart interval whereby the output voltage B+ cannot rise to its desired level during the restart period. Thus, upon conclusion of the restart period, indicated as point 220 of the restart waveform, the D flip-flop 100 again triggers the shutdown timer 110 for its predetermined time interval, as is illustrated at portion 222 of the shutdown timer waveform. As before, upon conclusion of the shutdown timer interval, the restart interval is again initiated and the shutdown circuitry inactivated. At this point, the fault has ceased and, during the restart time interval, the power supply is able to return to its desired level B+. Thus, at the conclusion of the restart interval the shutdown circuitry is again activated and the system continues as before.

In summary, an improved shutdown circuit, which finds particular application in a switching mode supply for a mobile data terminal, has been disclosed, which circuit is totally digital in operation and does not require the use of high stability, high cost components.

While a preferred embodiment of the invention has been described in detail, it should be apparent that many modifications and variations thereto are possible, all of which fall within the true spirit and scope of the invention.

I claim:

1. A shutdown circuit for a switching type power supply having a fixed reference oscillator with an output wherein the voltage produced by the supply is a function of the output from a controlled oscillator, comprising:
    low voltage sense means for comparing the output of the controlled oscillator to the output of the fixed reference oscillator, and generating an inhibit signal in response to a predetermined relationship between the fixed reference oscillator output and the output from the controlled oscillator;
    shutdown timer means coupled to the low voltage sense means for inhibiting operation of the power supply for a predetermined time interval in response to said inhibit signal.

2. The shutdown circuit of claim 1 wherein the controlled oscillator produces a variable duty cycle signal for controlling the power supply produced voltage, and the fixed reference oscillator has a fixed duty cycle, wherein the low voltage sense means comprises means for generating the inhibit signal in response to a predetermined relationship between the duty cycle of the controlled oscillator and the fixed duty cycle of the fixed reference oscillator 3. The shutdown circuit of claims 1 or 2 wherein the low voltage sense means further comprises:
    restart timer means for deactivating the low voltage sense means for a predetermined time interval following the predetermined interval of said shutdown timer.

* * * * *